US010876755B2

(12) United States Patent
Martin

(10) Patent No.: US 10,876,755 B2
(45) Date of Patent: Dec. 29, 2020

(54) SYSTEMS AND METHODS OF PROVIDING OCCUPANT FEEDBACK TO ENABLE SPACE OPTIMIZATION WITHIN THE BUILDING

(71) Applicant: Sensormatic Electronics, LLC, Boca Raton, FL (US)

(72) Inventor: Walter A. Martin, Ballymena (GB)

(73) Assignee: Sensormatic Electronics, LLC, Boca Raton, FL (US)

(*) Notice: Subject to any disclaimer, the term of this patent is extended or adjusted under 35 U.S.C. 154(b) by 9 days.

(21) Appl. No.: 16/217,242

(22) Filed: Dec. 12, 2018

(65) Prior Publication Data

US 2020/0191427 A1   Jun. 18, 2020

(51) Int. Cl.
*F24F 120/20* (2018.01)
*F24F 11/54* (2018.01)
*F24F 11/57* (2018.01)
*G05B 19/042* (2006.01)
*H04L 12/28* (2006.01)

(52) U.S. Cl.
CPC .............. *F24F 11/54* (2018.01); *F24F 11/57* (2018.01); *G05B 19/042* (2013.01); *F24F 2120/20* (2018.01); *G05B 2219/2614* (2013.01); *H04L 12/282* (2013.01)

(58) Field of Classification Search
CPC ........ F24F 11/54; F24F 11/57; F24F 2120/20; G05B 19/042; G05B 2219/2614; H04L 12/282
See application file for complete search history.

(56) References Cited

U.S. PATENT DOCUMENTS

2007/0138307 A1* 6/2007 Khoo ...................... F24F 11/30
                                                              236/1 C
2012/0143356 A1* 6/2012 Berg-Sonne ........... G05B 15/02
                                                              700/49

(Continued)

FOREIGN PATENT DOCUMENTS

WO    WO-2018/129182       7/2018

OTHER PUBLICATIONS

Extended European Search Report for European Application No. 19215497.9, dated Feb. 27, 2020, 7 pages.

*Primary Examiner* — Thomas C Lee
*Assistant Examiner* — Gary Collins
(74) *Attorney, Agent, or Firm* — Foley & Lardner LLP

(57) ABSTRACT

A computer implemented method for controlling the environmental conditions of a building in accordance with feedback from the occupants of the building is provided. The method includes detecting, by one or more processors, an occupant within a building space, and transmitting, by the one or more processors, a notification message to an occupant device associated with the occupant. The notification message includes a request to provide occupant feedback. The method includes receiving, by the one or more processors, an occupant feedback message from the occupant device. The occupant feedback message includes one or more quality ratings associated with one or more building conditions. The method includes assigning, by the one or more processors, a weighting factor to the occupant feedback message and performing an action to modify at least one of the building conditions responsive to the weighted occupant feedback message.

16 Claims, 8 Drawing Sheets

(56) References Cited

U.S. PATENT DOCUMENTS

| | | | |
|---|---|---|---|
| 2012/0239205 A1* | 9/2012 | Frerking | G05D 23/1917 |
| | | | 700/276 |
| 2015/0081107 A1* | 3/2015 | Graham | G05B 15/02 |
| | | | 700/276 |
| 2015/0338117 A1* | 11/2015 | Henneberger | G05B 15/02 |
| | | | 700/276 |
| 2015/0348220 A1 | 12/2015 | Sharma et al. | |
| 2016/0378081 A1* | 12/2016 | Della Corte | G07C 13/00 |
| | | | 700/275 |
| 2017/0276571 A1* | 9/2017 | Vitullo | G05B 23/0248 |
| 2018/0068403 A1* | 3/2018 | Vaughn | G06Q 10/20 |
| 2018/0202677 A1* | 7/2018 | Endel | F24F 11/30 |
| 2018/0204162 A1 | 7/2018 | Endel et al. | |
| 2018/0238577 A1 | 8/2018 | Drees et al. | |
| 2018/0322766 A1 | 11/2018 | Pierson et al. | |

\* cited by examiner

US 10,876,755 B2

SYSTEMS AND METHODS OF PROVIDING OCCUPANT FEEDBACK TO ENABLE SPACE OPTIMIZATION WITHIN THE BUILDING

BACKGROUND

Building such as, for example, commercial buildings, residential buildings, high-rise buildings, hotels, etc. typically use large building control systems such as fire detection systems, heating, ventilation, and air conditioning (HVAC) systems, access control systems, and video surveillance systems. Although these large building control systems can exhibit a significant degree of control over many of the environmental conditions of the building, it is difficult to ensure the control scheme of the building is sufficiently responsive to the environmental conditions experienced by the occupants of the building.

SUMMARY

One implementation of the present disclosure is a method for controlling the environmental conditions of a building in accordance with feedback from the occupants of the building. The method includes detecting, by one or more processors, an occupant within a building space, and transmitting, by the one or more processors, a notification message to an occupant device associated with the occupant. The notification message includes a request to provide occupant feedback. The method includes receiving, by the one or more processors, an occupant feedback message from the occupant device. The occupant feedback message includes one or more quality ratings associated with one or more building conditions. The method includes assigning, by the one or more processors, a weighting factor to the occupant feedback message and performing, by the one or more processors, an action to modify at least one of the building conditions responsive to the weighted occupant feedback message.

Another implementation of the present disclosure is a system for controlling the environmental conditions of a building in accordance with feedback from the occupants of the building. The system includes multiple mobile devices. Each mobile device is associated with an occupant in a building space. The system further includes a supervisory controller communicably coupled to the mobile devices. The supervisory controller is configured to detect the occupant within the building space, transmit a notification message to the mobile device associated with the occupant, receive an occupant feedback message from the mobile device, assign a weighting factor to the occupant feedback message, and perform an action to modify building conditions responsive to the weighted occupant feedback message.

Another implementation of the present disclosure is a method for providing occupant feedback regarding the environmental conditions of a building from an occupant device. The method includes receiving a notification message requesting occupant feedback, opening an occupant feedback application, capturing multiple occupant feedback inputs, and transmitting an occupant feedback message including the multiple occupant feedback inputs.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
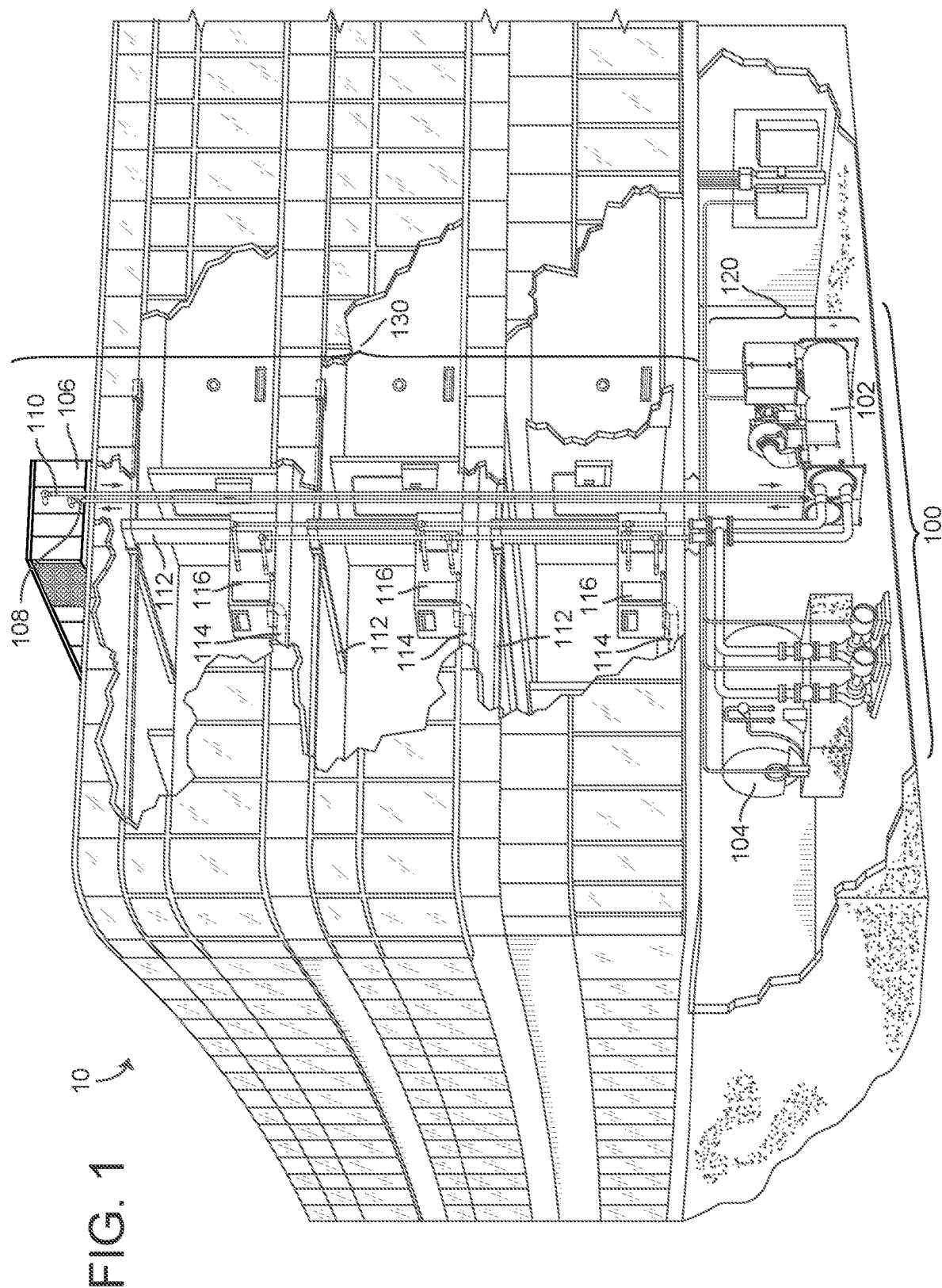
FIG. 1 is a drawing of a building equipped with a HVAC system, according to an embodiment.

The present disclosure relates generally to the field of building management systems, and more particularly to systems and methods utilizing an internet enabled device (e.g., smartphone) running an APP for occupants to provide feedback to improve their experience, comfort, and satisfaction of a space within a building. Embodiments of an internet enabled device (e.g., smartphone) running a computer application program or "APP" for providing enhanced capabilities to assist with capturing of feedback regarding the conditions of a space from occupants within the space in accordance with the present disclosure will now be described more fully hereinafter with reference to the accompanying drawings, in which illustrative embodiments of the present disclosure are presented. The internet enabled device and APP of the present disclosure may be embodied in many different forms and should not be construed as being limited to the embodiments set forth herein. Rather, these embodiments are provided so that this disclosure will convey certain example aspects of the internet enabled device and/or APP.

The present disclosure relates to an internet enabled device such as, for example, a smartphone, for running a computer program or APP, which can be used by the occupants of a building space to provide feedback regarding the environmental conditions of a building space. Based on the feedback provided by occupants, the environmental conditions of the building space can be manually or automatically modified to improve the comfort, cleanliness, and security of the building space.

It can be difficult to operate buildings in an efficient manner unless the occupants of the building feel comfortable. Comfort is inherently difficult to measure or simulate because it is highly subjective, and can depend upon air temperature, humidity, radiant temperature, air velocity, metabolic rates, clothing levels, and individual experiences of sensations based on physiology. Attempts to mathematically simulate comfort levels using Computational Fluid Dynamics (CFD) can become highly complex and resource-intensive due to the number of potential variables, and the existence of non-uniform conditions.

If a space within a building is uncomfortable, the occupants will often resort to inefficient means of heating or cooling the space, resulting in higher energy costs. These inefficient means might include opening a window or operating a space heater. In some cases, a building occupant may wish to provide feedback regarding the conditions of a building space, but may lack a frictionless or socially desirable means to do so. For example, occupants of a building space may have negative opinions regarding the cleanliness of a building space, but may not wish to provide those opinions in person. Even if an occupant does not mind voicing negative opinions in person, the occupant may not know the identity of the appropriate recipient for those opinions (i.e., a person empowered to modify the conditions of the building).

Systems and methods in accordance with the present disclosure can facilitate soliciting and providing occupant feedback regarding the conditions of a building space using a smartphone or other mobile device. Systems and methods in accordance with the present disclosure can supplementing current occupant feedback procedures to more accurately operate building management systems, including HVAC systems, which can improve comfort and/or energy efficiency.

Building Management System and HVAC System

Referring now to FIGS. 1-4, a building management system (BMS) and HVAC system in which the systems and methods of the present disclosure can be implemented is depicted. Referring particularly to FIG. 1, a perspective view of a building 10 is depicted. Building 10 is served by a BMS. A BMS is, in general, a system of devices that can control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) that provide heating, cooling, ventilation, or other services for building 10. For example, HVAC system 100 is depicted to include a waterside system 120 and an airside system 130. Waterside system 120 can provide a heated or chilled fluid to an air handling unit of airside system 130. Airside system 130 can use the heated or chilled fluid to heat or cool an airflow provided to building 10. A waterside system and airside system which can be used in HVAC system 100 are described in greater detail with reference to FIGS. 2-3.

HVAC system 100 is depicted to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as depicted in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers that pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is depicted to include a separate VAV unit 116 on each floor or zone of building 10. VAV units 116 can include dampers or other flow control elements that can be operated to control an amount of the supply airflow provided to individual zones of building 10. In some embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) that measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
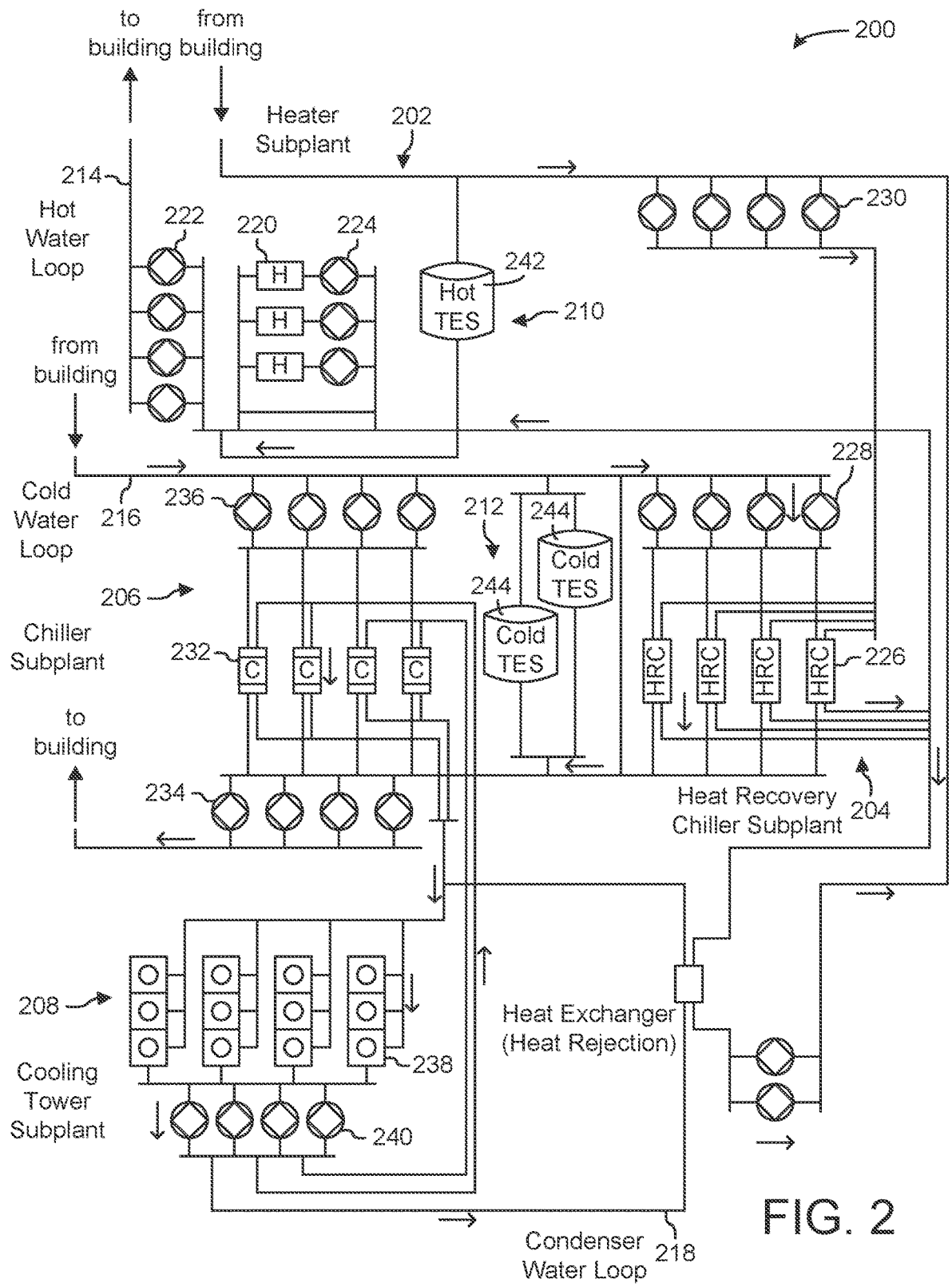
FIG. 2 is a schematic diagram of a waterside system which may be used in conjunction with the building of FIG. 1, according to an embodiment.

Referring now to FIG. 2, a block diagram of a waterside system 200 is depicted. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is depicted as a central plant having a plurality of subplants 202-212. Subplants 202-212 are depicted to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can heat water in a hot water loop 214 that circulates the hot water between heater subplant 202 and building 10. Chiller subplant 206 can chill water in a cold water loop 216 that circulates the cold water between chiller subplant 206 building 10. Heat recovery chiller subplant 204 can transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are depicted and described as heating and cooling water for circulation to a building, it is understood that any other type of working fluid (e.g., glycol, $CO_2$, etc.) can be used in place of or in addition to water to serve the thermal energy loads. In some embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment that can facilitate the functions of the subplant. For example, heater subplant 202 is depicted to include a plurality of heating elements 220 (e.g., boilers, electric heaters, etc.) that add heat to the hot water in hot water loop 214. Heater subplant 202 is also depicted to include several pumps 222 and 224 that circulate the hot water in hot water loop 214 and to control the flow rate of the hot water through individual heating elements 220. Chiller subplant 206 is depicted to include a plurality of chillers 232 that remove heat from the cold water in cold water loop 216. Chiller subplant 206 is also depicted to include several pumps 234 and 236 that circulate the cold water in cold water loop 216 and control the flow rate of the cold water through individual chillers 232.

Heat recovery chiller subplant 204 is depicted to include a plurality of heat recovery heat exchangers 226 (e.g., refrigeration circuits) that can transfer heat from cold water loop 216 to hot water loop 214. Heat recovery chiller subplant 204 is also depicted to include several pumps 228 and 230 that can circulate the hot water and/or cold water through heat recovery heat exchangers 226 and to control the flow rate of the water through individual heat recovery heat exchangers 226. Cooling tower subplant 208 is depicted to include a plurality of cooling towers 238 that can remove heat from the condenser water in condenser water loop 218. Cooling tower subplant 208 is also depicted to include several pumps 240 that can circulate the condenser water in condenser water loop 218 and to control the flow rate of the condenser water through individual cooling towers 238.

Hot TES subplant 210 is depicted to include a hot TES tank 242 that can store the hot water for later use. Hot TES subplant 210 can also include one or more pumps or valves that can control the flow rate of the hot water into or out of hot TES tank 242. Cold TES subplant 212 is depicted to include cold TES tanks 244 that can store the cold water for later use. Cold TES subplant 212 can also include one or more pumps or valves that can control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
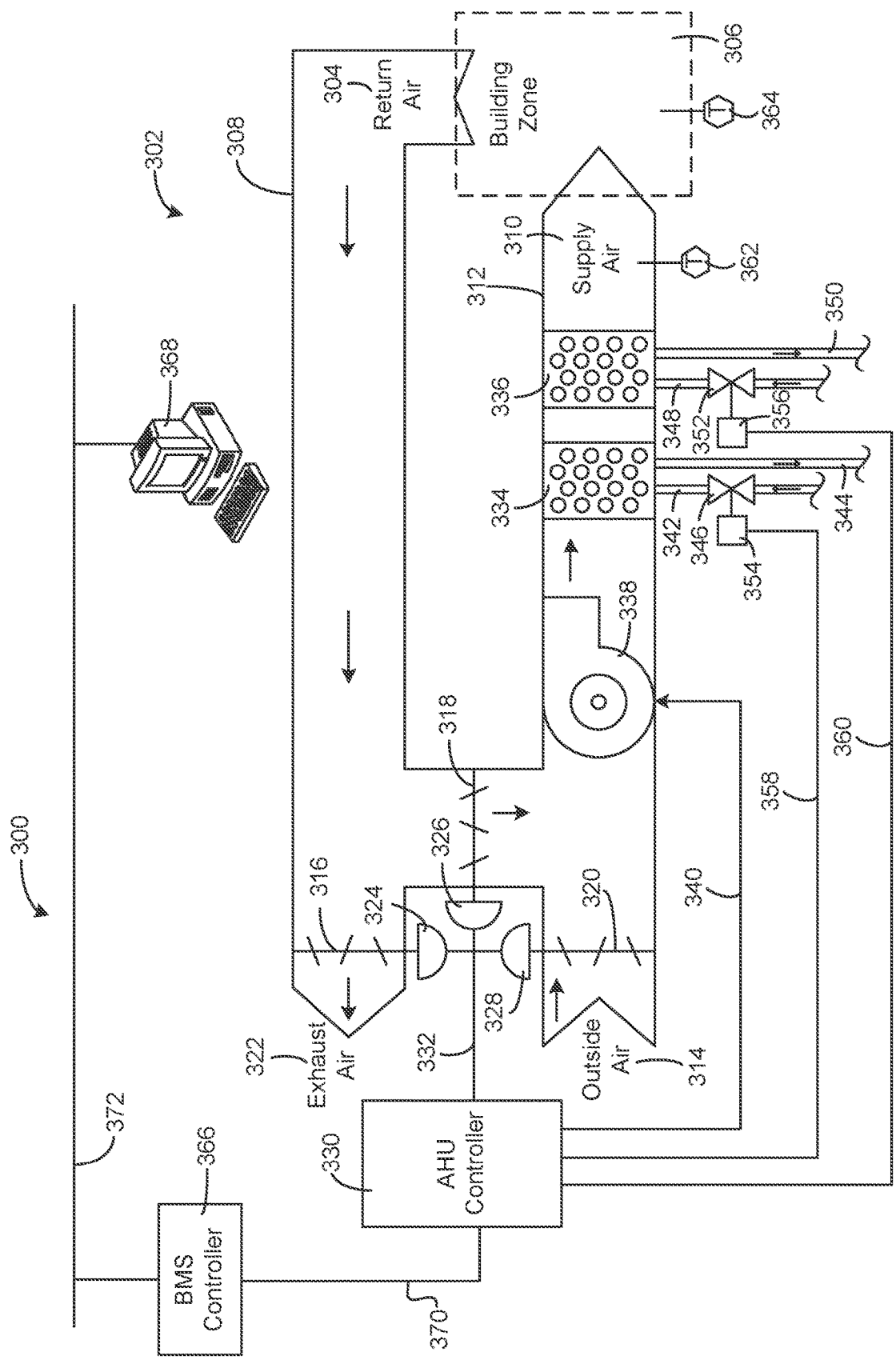
FIG. 3 is a schematic diagram of an airside system which may be used in conjunction with the building of FIG. 1, according to an embodiment.

Referring now to FIG. 3, a block diagram of an airside system 300 is depicted. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is depicted to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as depicted in FIG. 1) or otherwise positioned to receive both return air 304 and outside air 314. AHU 302 can be that can operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller that can use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is depicted to include a cooling coil 334, a heating coil 336, and a fan 338 positioned within supply air duct 312. Fan 338 can be that can force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is depicted to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as depicted in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
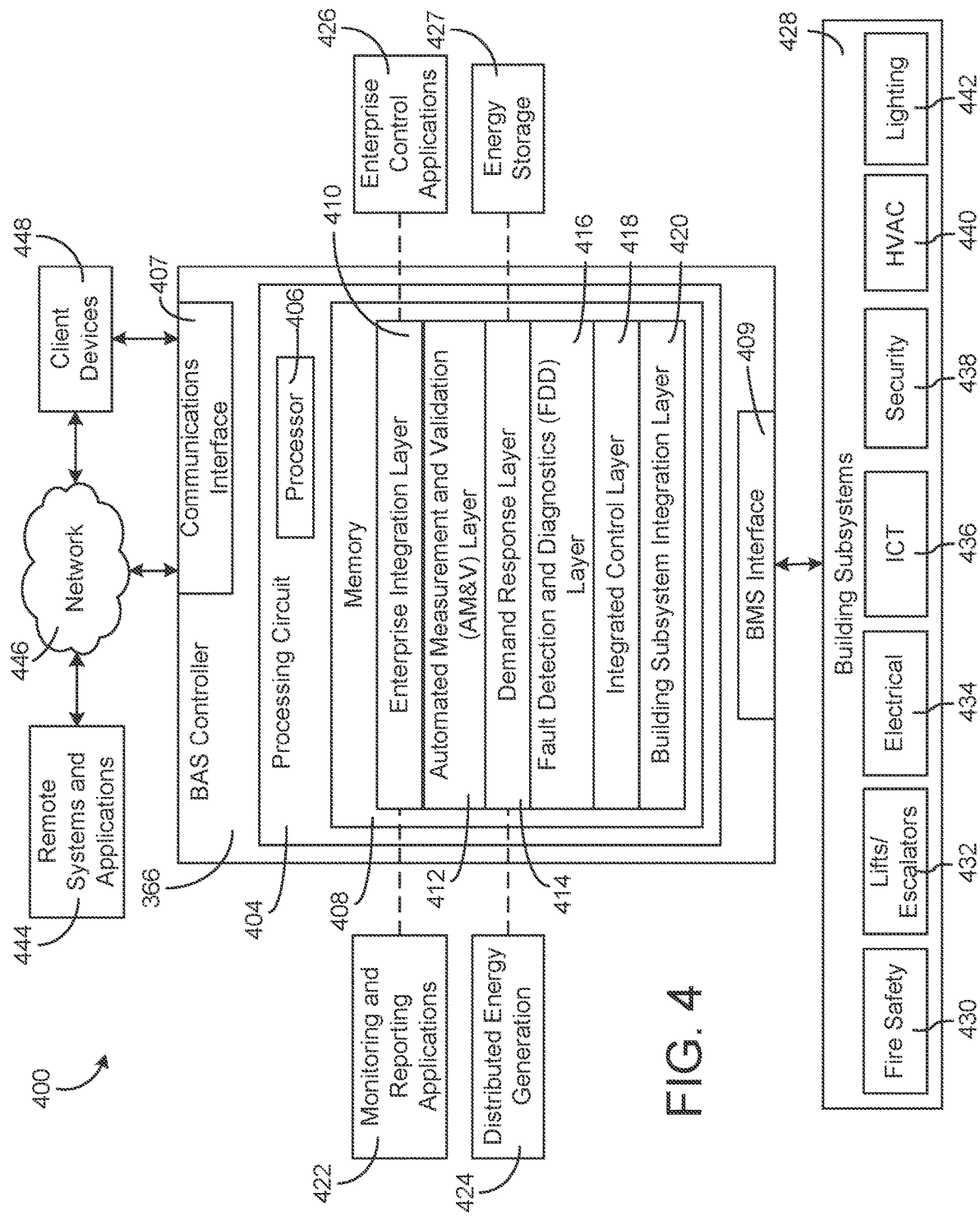
FIG. 4 is a block diagram of a building management system (BMS) which may be used to monitor and control the building of FIG. 1, according to an embodiment.

Referring now to FIG. 4, a block diagram of a building management system (BMS) 400 is depicted. BMS 400 can be implemented in building 10 to automatically monitor and control various building functions. BMS 400 is depicted to include BMS controller 366 and a plurality of building subsystems 428. Building subsystems 428 are depicted to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. Building subsystems 428 can include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices that can controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is depicted to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In some embodiments, both communications interface 407 and BMS interface 409 are Ethernet interfaces or are the same Ethernet interface.

Still referring to FIG. 4, BMS controller 366 is depicted to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is depicted to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be serve clients or local applications with information and services to support a variety of enterprise-level applications. For example, enterprise control applications 426 can provide subsystem-spanning control to a graphical user interface (GUI) or to any number of enterprise-level business applications (e.g., accounting systems, user identification systems, etc.). Enterprise control applications 426 can provide configuration GUIs for configuring BMS controller 366. In some embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also manage communications between building subsystems 428. Building subsystem integration layer 420 translate communications (e.g., sensor data, input signals, output signals, etc.) across a plurality of multi-vendor/multi-protocol systems.

Demand response layer 414 can optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic to determine when to utilize stored energy. For example, demand response layer 414 can determine to begin using energy from energy storage 427 just prior to the beginning of a peak use hour.

In some embodiments, demand response layer 414 includes a control module that can actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can use an input from a first subsystem to make an energy-saving control decision for a second subsystem. Results of these decisions can be communicated back to building subsystem integration layer 420.

Integrated control layer 418 is depicted to be logically below demand response layer 414. Integrated control layer 418 can enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can provide calculated inputs (e.g., aggregations) to these higher levels based on outputs from more than one building subsystem.

Automated measurement and validation (AM&V) layer 412 can verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm that can attempt to repair the fault or to work-around the fault.

FDD layer 416 can output a specific identification of the faulty component or cause of the fault (e.g., loose damper linkage) using detailed subsystem inputs available at building subsystem integration layer 420. In some embodiments, FDD layer 416 can provide "fault" events to integrated control layer 418 which executes control strategies and policies in response to the received fault events. According to an embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Occupant Feedback System

Figure 5:
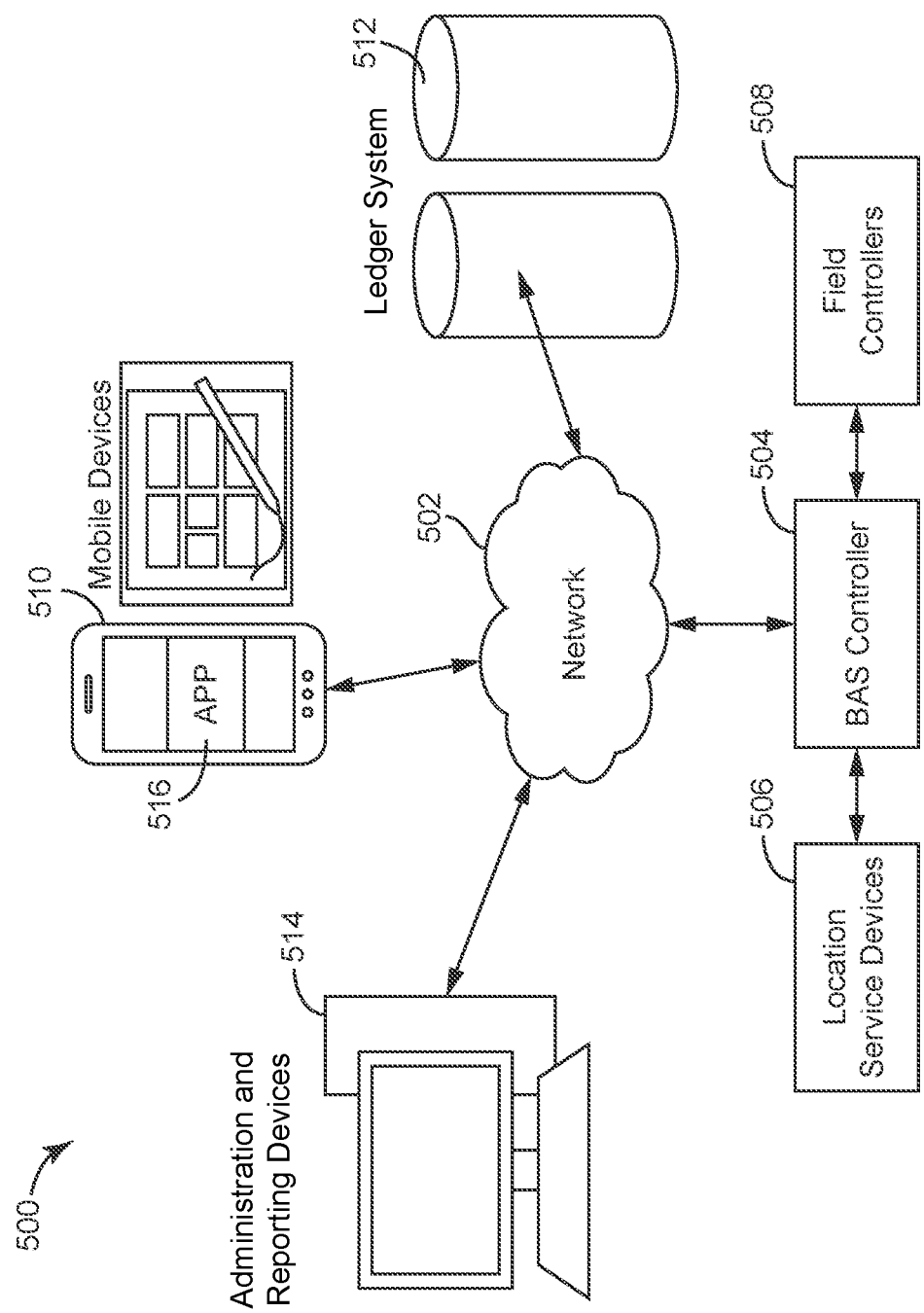
FIG. 5 is a block diagram of an occupant feedback system which may be used to monitor and control the building of FIG. 1, according to an embodiment.

Referring now to FIG. 5, a block diagram of an occupant feedback system 500 is depicted. In various embodiments, system 500 may be a subsystem of any of the systems described above with reference to FIGS. 1-4, including HVAC system 100, waterside system 200, airside system 300, and BMS 400.

The system 500 is depicted to include a supervisory or BAS controller 504, location service devices 506, field controllers 508, client devices 510, a ledger system 512, and administration and reporting devices 514. One or more of the components of system 500 may be communicably coupled using network 502. Network 502 can be any kind of network such as the Internet, TCP/IP, Ethernet, LAN, WAN, Wi-Fi, Zigbee, BACnet, 3G, LTE, Li-Fi, and/or any combination thereof.

The supervisory controller 504 can be identical or substantially similar to BMS controller 366, described above with reference to FIGS. 3-4. In some embodiments, controller 504 can to perform functions related to the solicitation of occupant feedback and the performance of control functions to modify environmental conditions of the building according to the occupant feedback received. For example, in some embodiments, controller 504 can perform a process 700 to capture occupant feedback, described in greater detail below with reference to FIG. 7. Occupant feedback can include feedback regarding environmental conditions of the building space. Occupant feedback can include indications of a comfort level corresponding to the environmental conditions. The supervisory controller 504 can determine the occupant feedback can include a quantitative value mapped to a qualitive feedback (e.g., "too hot" can be mapped to a relatively high value, such as a value greater than an average value of a discrete or continuous range of values). Occupant feedback can relate to environmental conditions such as temperature, humidity, and cleanliness.

The supervisory controller 504 can calculate a weighted average of the occupant feedback. For example, the supervisory controller 504 can assign a weight to each occupant feedback value, and calculate the weighted average based on each weighted occupant feedback value. In some embodiments, the supervisory controller 504 assigns the weight based on a credibility corresponding to the occupant from which the occupant feedback was received. The supervisory controller 504 can maintain a credibility database (e.g., ledger system 512, described in further detail below) assigning a credibility to each occupant, and can retrieve the credibility corresponding to the occupant from which the occupant feedback was received from the credibility database. The supervisory controller 504 can retrieve the credibility using an identifier of the occupant (e.g., the occupant's name, an occupant ID number, an occupant device serial number) mapped to the occupant in the credibility database; the identifier may be received with the occupant feedback, and may include an identifier of the occupant itself and/or an identifier of the client device 510 expected to correspond to the occupant.

The supervisory controller 504 can determine whether the occupant feedback indicates that the environmental conditions of the building meet one or more corresponding building criteria. The building criteria may correspond to whether the occupant feedback indicates the building space is comfortable. For example, the supervisory controller 504 can compare the occupant feedback (e.g., a weighted average of the occupant feedback) to a target value, and determine that the occupant feedback indicates that the environmental conditions of the building space are not comfortable responsive to a difference between the occupant feedback and the target value, determined based on the comparison, is greater than a threshold difference.

The supervisory controller 504 generates commands to modify the environmental conditions of the building space responsive to the occupant feedback, such as if the supervisory controller 504 determines the occupant feedback to indicate that the environmental conditions of the building space are not comfortable. The supervisory controller 504 can evaluate an operating condition of the field controller(s) 508 based on the occupant feedback, and modify operation of the field controller(s) 508 based on the evaluation. For example, the operating condition may include whether the field controller(s) 508 are functioning to modify an environmental parameter (e.g., temperature) relative to a predetermined setpoint of the environmental parameter (e.g., target setpoint of room temperature, such as 70 degrees Fahrenheit, for the building space). Responsive to determining that (1) the field controller(s) 508 are not modifying the environmental parameter and (2) the occupant feedback indicates that the environmental conditions are not comfortable, the supervisory controller 504 can cause the field controller(s) 508 to adjust the predetermined setpoint. For example, if the supervisory controller 504 determines the occupant feedback to indicate that the building space is too hot (or too cold), the supervisory controller 504 can cause the field controller(s) 508 to adjust a respective temperature setpoint to be lower (or higher), such as to cause the field controller(s) 508 to cool the building at relatively higher temperatures (or cool the building at relatively lower temperatures).

In some embodiments, the supervisory controller 504 generates commands based on a count of occupant feedback, such as by comparing the count of occupant feedback to a threshold count (which may be a function of a total number of occupants) and generating commands to modify operation of field controller(s) 508 and/or HVAC devices responsive to the count exceeding the threshold count. The supervisory controller 504 can further determine if a majority of the occupants in a building space provide feedback indicating that the space is uncomfortable. For example, if there are ten occupants in a building space and six of those occupants provide feedback to the supervisory controller 504 indicating that the building space is thermally uncomfortable, the supervisory controller 504 transmits control signals to operate HVAC devices within the building space (e.g., fans, cooling coils) to reduce the temperature of building space. In some embodiments, the control signals could include modifying a temperature setpoint used in a temperature control algorithm for the HVAC devices.

The supervisory controller 504 can generate commands to modify the environmental conditions of the building space based on the severity of the feedback. For example, if, in a building space of ten occupants, two occupants report mild thermal discomfort (which can be mapped to a lower quantitative value) and two occupants report severe thermal discomfort (which can be mapped to a higher quantitative value), the presence of multiple occupants indicating severe discomfort can prompt the supervisory controller 504 to transmit control signals to reduce the temperature of the building space. The credibility assigned to the occupant in the credibility database can affect whether a minority of occupants in a building space cause the supervisory controller 504 to generate commands to modify the environmental conditions of the building space. Returning to the previous example, if one of the two occupants reporting severe thermal discomfort has a history of providing anomalous and/or suspect feedback when compared with other occupants, the supervisory controller 504 can assign a weighting factor to minimize the impact of that occupant's feedback in the weighted average of the occupant feedback. When the supervisory controller 504 compares the weighted occupant feedback average to the target value, the presence of the suspect occupant feedback in the weighted average can result in the difference between the average and the target value not exceeding the threshold difference, meaning that the supervisory controller 504 does not transmit control signals to modify the temperature of the building space.

The supervisory controller 504 can capture feedback from occupants subsequent to generating control signals to modify the environmental conditions of the building space. For example, if the supervisory controller 504 transmits control signals to reduce the temperature of the building space, the supervisory controller 504 can capture additional feedback from occupants after a specified period of time, or once a thermostat or a sensor located in the building space indicate that the temperature has dropped. If a majority of occupants provide feedback indicating that the building space is now thermally comfortable, the supervisory controller 504 can transmit additional control signals to maintain the building space at the current temperature and halt additional cooling. Conversely, if a majority of occupants provide feedback indicating that the building space is still thermally uncomfortable, the supervisory controller 504 can transmit control signals to increase cooling to the building space.

The location service devices 506 can detect and count the number of occupants within a building space using any suitable method (e.g., cameras, infrared sensors, motion sensors). In some embodiments, the location service devices 506 can detect occupants through detection of the presence of occupant devices and can communicate with the occupant devices using Bluetooth Low Energy (BLE) methods. In still further embodiments, the location service devices 506 can be devices implemented as part of a Qualcomm Glance system.

The field controllers 508 can include various devices located throughout the building that are configured to control subsystems and devices that affect the environmental conditions of the building space. For example, the field controllers 508 can control devices and systems including, but not limited to chillers, boilers, rooftop AHUs, VAV units, economizers, heating coils, cooling coils, fans, pumps, valves, and dampers. The field controllers 508 control the devices and systems responsive to commands received from the supervisory controller 504. For example, based on control signals received from the supervisory controller 504, the field controllers 508 could perform tasks including, but not limited to, modifying an operating load of a chiller or boiler, changing a fan speed, or opening or closing a valve or damper.

The client device(s) 510 can be any of various electronic devices, particularly portable electronic devices associated with occupants of a space, such as smartphones or tablets. In some embodiments, the client device 510 could also include a smartwatch or other wearable device. The client device 510 can include a user interface including a display device and a user input device (not depicted). The client device 510 can include a processing circuit including a processor and memory (not depicted).

The client device 510 can use the processing circuit to execute an application (APP) 516, such as to execute functions described in further detail with reference to FIGS. 6 and 8 below. The APP 516 can be an occupant feedback application. In some embodiments, the client device 510 can establish a communication link with the BAS controller 504 and/or other devices of the system 500 via the network 502.

Upon initial launching of the APP 516, the occupant can be presented with a screen requesting that they register to use the APP 516. Registration can include creating a username and password and supplying some basic personal information such as, for example, name and email address. If the occupant works in the building, the personal information can include the occupant's employer and/or department details regarding the building space where the occupant works. Registration information associated with the occupant can be stored in a database accessible by the network 502, for example, the ledger system 512.

A blockchain or immutable ledger of the ledger system 512 can maintain or utilize a distributed data chain among a plurality of devices. The plurality of devices can communicate via a network such as a TCP/IP network. In various embodiments, the blockchain 512 does not include any kind of central server and/or does not rely on a central server to operate. Rather, the plurality of devices can each store a copy of a data chain that includes information that can be distributed among all of the devices.

The data chain can be a chain of multiple blocks. The ledger system 512 links each block to a previous block based on a hash value. The hash value of a particular block relies on the hash of the previous block and the data inside the particular block. Since the blocks are linked in this way, changes to a block in the chain changes that block's hash which breaks the link between blocks. Each of the blocks in the data chain includes a digital signature that can be used to verify that the block is authentic, that is, that the data of the block was created by the device that claims to have created the data. As more blocks are added to the data chain, it becomes exponentially more difficult to compromise the data chain.

Hash functions generate the hash values linking blocks together. Hash functions are not reversible, that is, one cannot predict the output of a hash function of a given input. A hash solution for a block is generated by repeatedly hashing an adjustable value in the block called a nonce, the hash value of a previous block in the data chain, and the data to be added to the data chain. A hash that meets a difficulty criterion is considered a solution to the block and can be added to the data chain. In some embodiments, the difficulty criteria is a hash value that is less than a predefined amount or more than a predefined amount. A device using the data chain receives requests to add new blocks to the data chain from services, devices, or other entities in the system. The device can add the block to the data chain by generating a hash solution. This method may be known as proof of work.

The unpredictable nature of the hash function makes it difficult for a device to find a random input that produces a valid hash of the block. In some cases, depending on the difficulty criterion, it can take trillions of different trials trying nonce values until a valid hash is found. This can make it difficult to change data in a block of the data chain. By distributing the blocks on the network, the disadvantage of having a single point of failure is eliminated and the network is tolerant to hacking attacks at a single node of the network.

In some embodiments, the ledger system 512 maintains records of occupants within the spaces of a building. For example, each occupant record can include a credibility rating or weighting factor associated with the occupant. The credibility rating or weighting factor can be assigned to the occupant based on the veracity of the occupant's feedback over time. For example, if a particular occupant consistently provides anomalous feedback when compared with the feedback provided by the other occupants of a space, the credibility rating or weighting factor associated with the occupant may be adjusted so that the occupant's feedback has a smaller effect on the aggregate feedback generated by all occupants of a space. Further details regarding the use of credibility ratings and weighting factors are included below with reference to FIG. 7.

In some embodiments, the ledger system 512 can maintain records of work requests generated based on occupant feedback. For example, multiple occupants may provide feedback indicating that a building space has insufficient lighting. In some embodiments, this feedback can include pictures of the space taken by the occupants to demonstrate the need for additional lighting. In response to the occupant feedback, a building supervisor may generate a work request to install additional lighting in the building space. Completion of the work request can be tracked and stored on the ledger system 512. Similar work requests can be generated and stored on the ledger system 512 in response to occupant feedback regarding the cleanliness of a building space, the security of a building space, or any other condition of the building.

Still referring to FIG. 5, system 500 is additionally depicted to include administration and reporting devices 514. In various embodiments, administration and reporting devices 514 can include a desktop computer, a smartphone, or a tablet computer. Administration and reporting devices 514 can perform a variety of tasks related to data analysis, reporting, building visualization and workflow. For example, administration and reporting devices 514 can be configured to run or access reporting programs to track the trends of occupant feedback over time. Through access to historical occupant feedback reports, building administrators can perform tasks such as energy forecasting and investing planning. In still further embodiments, administration and reporting devices 514 can be configured to display a real time dashboard of the status of the system 500. For example, the dashboard could be configured to display alerts when a device within the system 500 is experiencing a fault condition. The dashboard could also be used to configure various parameters within the system 500 (e.g., notification message settings, delay periods, occupant detection settings).

Figure 6:
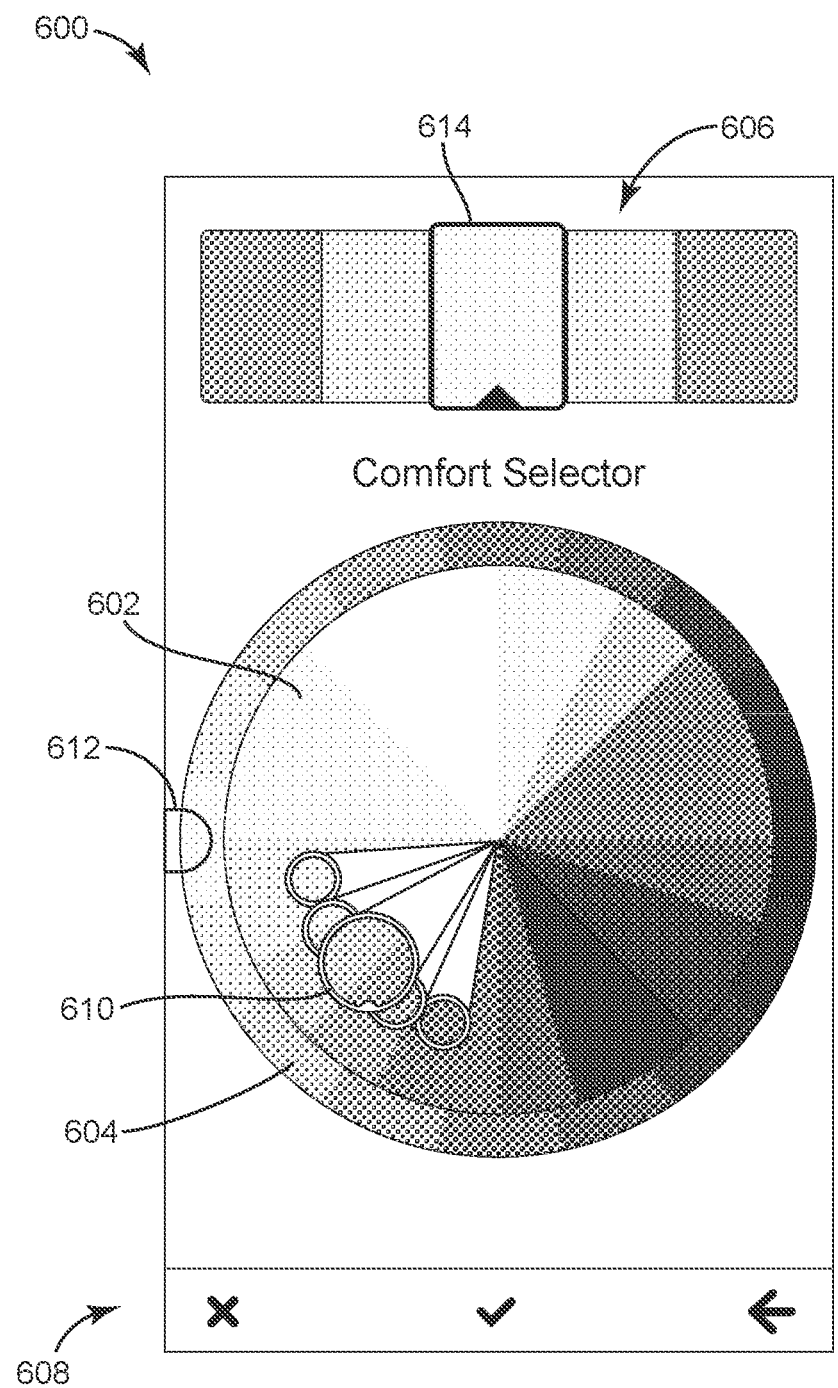
FIG. 6 is a drawing of a user interface of an occupant device that may be utilized to provide occupant feedback in the building of FIG. 1, according to an embodiment.

Turning now to FIG. 6, a user interface 600 of an occupant feedback APP is depicted. The APP may be downloaded onto an occupant device by an occupant of a space within a building. In various embodiments, the occupant device can be client device 510 and the occupant feedback APP can be APP 516, both described above with reference to FIG. 5.

The occupant can download the APP onto a mobile device before or upon entering the building. For example, signage located at the entryways of the building may prompt the occupant to download the APP. In some embodiments, a notification message transmitted to the occupant device upon detection of the occupant within the building can include a hyperlink to download the APP. In still further embodiments, the APP is cloud-based and accessible using an internet browser rather than a program downloaded to the occupant's device.

The user interface 600 is depicted to include, among other components, a central feedback selection wheel 602, an outer feedback selection wheel 604, a feedback selection confirmation bar 606, and a navigation bar 608. The central feedback selection wheel 602 can permit an occupant to assign a quality rating to a condition of a space. For example, the condition can be overall comfort level, temperature, humidity, air freshness, cleanliness, security, adequacy of lighting, or any other condition that may be associated with a space. In some embodiments, the central feedback selection wheel 602 can include a continuous gradient of colors representing the occupant's quality rating regarding the condition. For example, in some embodiments, a green selection can indicate a comfortable condition, a yellow or orange selection can indicate a slightly warmer than comfortable condition, a red selection can indicate a much warmer than comfortable condition, and a purple or blue selection can indicate a much colder than comfortable condition.

In some embodiments, the central feedback selection wheel 602 can include a discrete number of colored segments rather than a gradient of colors. In still further embodiments, the central feedback selection wheel 602 does not utilize colors to represent the occupant's quality rating regarding the condition. Instead, the selection wheel 602 can utilize a numerical scale (e.g., a scale of 0-10, with a 10 selection indicating a fully comfortable condition and a 0 selection indicating a fully uncomfortable condition). In further embodiments, the selection wheel 602 can utilize emoticons or other images (e.g., a happy face selection indicating a comfortable condition, a sad face selection indicating an uncomfortable condition).

The occupant can assign a quality rating from the central feedback selection wheel 602 using the central wheel selector 610. In some embodiments, an occupant can drag and rotate the central wheel selector 610 about the central feedback selection wheel 602 until the occupant's desired quality rating is contained within the selector 610. In some embodiments, the central wheel selector 610 is stationary and the occupant can drag and rotate the central feedback selection wheel 602 until the occupant's desired quality rating is contained within the selector 610.

In some embodiments, the central wheel selector 610 can highlight multiple colors/numbers/images of the central feedback selection wheel 602 simultaneously. For example, as depicted in FIG. 6, the central wheel selector 610 can include a larger central portion flanked by smaller portions on either side to enable selection of up to five colors from the central feedback selection wheel 602 simultaneously. In some embodiments, the central wheel selector 610 can enable the selection of a different number of colors from the central feedback selection wheel 602 simultaneously (e.g., three colors, seven colors).

The colors highlighted by the central feedback selection wheel 602 can be replicated in the feedback selection confirmation bar 606. For example, as depicted in FIG. 6, when the central wheel selector 610 is configured to highlight five colors simultaneously from the central feedback selection wheel 602, the same five colors can be replicated in the feedback selection confirmation bar 606. In some embodiments, the occupant can slide the confirmation bar selector 614 along the confirmation bar 606 to confirm the occupant's quality rating selection. Enabling the occupant a second means to consider and confirm the assigned quality rating can ensure thoughtfulness and a high caliber of feedback solicited from occupants.

The outer feedback selection wheel 604 can permit an occupant of a space to provide a quality rating to a different building space condition than the condition rated using the central feedback selection wheel 602. In some embodiments, the conditions rated using the selection wheels 602 and 604 can be related. For example, if the central feedback selection wheel 602 is configured to permit an occupant to assign a quality rating to a thermal comfort condition, the outer feedback selection wheel 604 can be used to permit an occupant to assign a quality rating to an air freshness condition. Similar to the central feedback selection wheel 602, the outer feedback selection wheel 604 can include a continuous gradient of colors, a discrete number of color segments, numbers, icons, pictures, or any other means of representing a quality selection. In some embodiments, assignment of a quality rating can be achieved by the occupant rotating the outer feedback selection wheel 604 until the color, image, or number representative of the occupant's quality rating is contained within outer wheel selector 612. In some embodiments, assignment of the quality rating is achieved by the occupant rotating the outer wheel selector 612 about the outer feedback selection wheel 604 until the desired quality rating is contained within outer wheel 612.

The navigation bar 608 can include any buttons, icons, hyperlinks, controls etc. required to navigate within the user interface 600. For example, as depicted in FIG. 6, the navigation bar 608 can include a check mark used to confirm the occupant's selection of one or more quality ratings, while an "X" can be used to cancel the occupant's selection of one or more quality ratings. The navigation bar 608 can further include buttons, etc. to navigate between the various user interface screens of the APP. For example, as depicted in FIG. 6, the navigation bar 608 can include a back arrow used to navigate away from the user interface 600 to a main menu screen or a previous menu screen.

FIG. 6 depicts a possible user interface 600 for providing occupant feedback through the APP; many user interfaces configurations can be utilized by the APP to gather occupant feedback regarding the conditions of a building space. For example, one user interface of the APP could access a camera of the mobile device and permit an occupant to take a picture of a building space to provide feedback regarding the cleanliness or adequacy of lighting in a building space. User interface configurations could include text boxes that permit an occupant to enter comments regarding a building space. In further embodiments, the APP can directly access sensors integrated into the mobile device (e.g., temperature, light, humidity) to passively gather data regarding the conditions of a building space without the need for active input from the occupant.

Figure 7:
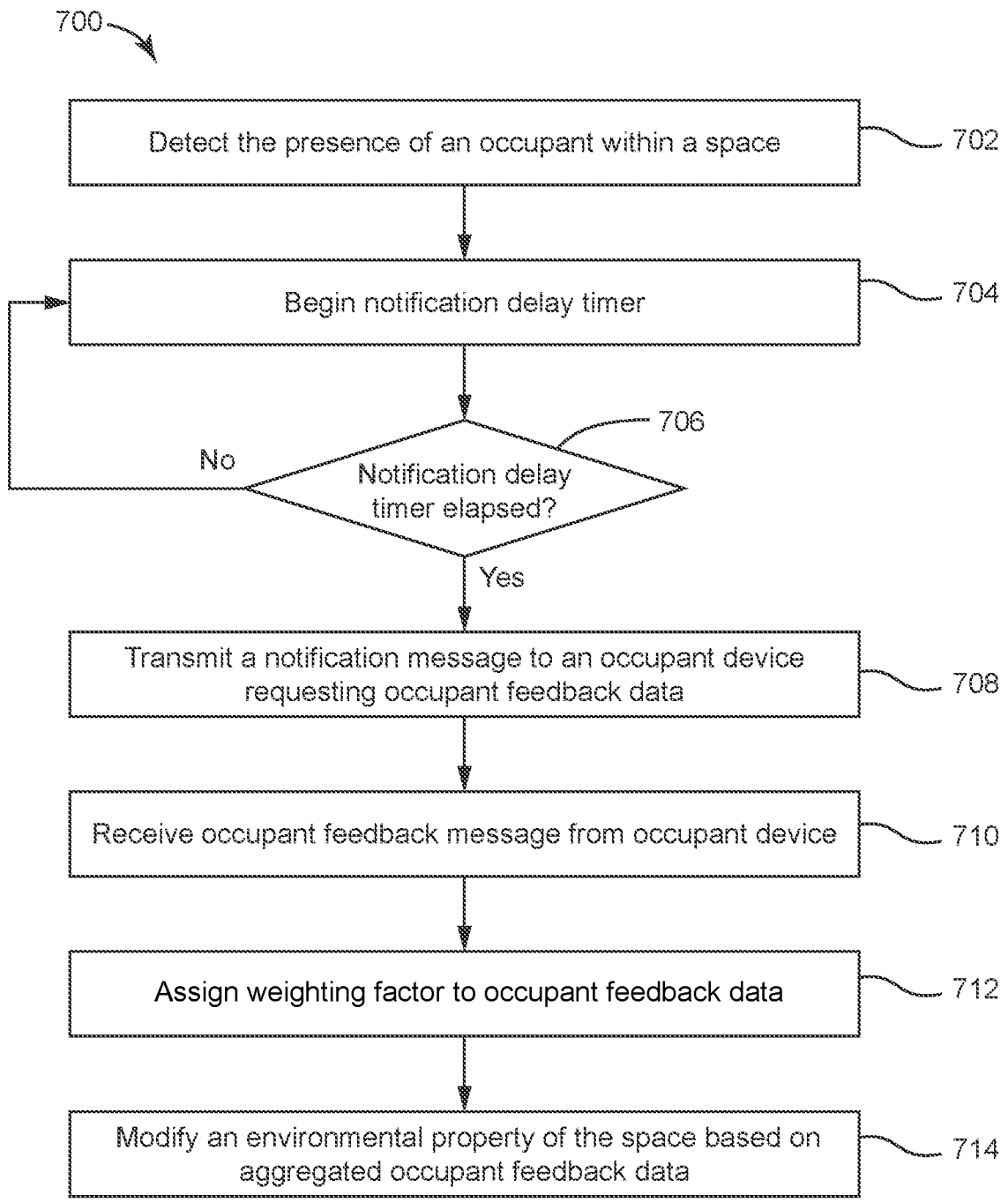
FIG. 7 is a flowchart of a process for capturing occupant feedback from an occupant device, according to an embodiment.

Referring now to FIG. 7, a computer-implemented method 700 for capturing occupant feedback is depicted according to an embodiment of the present disclosure. The method 700 may be performed by various systems and devices disclosed herein. For example, the method 700 can be performed primarily by a supervisory device (e.g., the BAS controller 504 of the system 500).

At 702, the supervisory device (e.g., the BAS controller 504) detects the presence of an occupant within a space. In some embodiments, the supervisory device communicates with dedicated occupant tracking devices (e.g., location service devices 506) in order to detect the presence of one or more occupants within a space via detection of an occupant device. For example, an occupant tracking device can detect a Bluetooth signal emanating from an occupant device (e.g., client device 510). In some embodiments, the occupant tracking devices can detect the presence of occupants using cameras, infrared sensors, or any other suitable method.

At 704, the supervisory device begins a notification delay timer. The notification delay timer permits an occupant time to observe and become acclimated to the environmental conditions of a building space. Put another way, the occupant might be likely to ignore or provide inaccurate feedback if prompted to provide feedback immediately upon entering a building space. By including the notification delay timer, the quality of feedback received from occupants is thereby improved. In various embodiments, the notification delay timer can be configurable. For example, the notification delay timer can be configured to run for a delay period of five minutes, ten minutes, thirty minutes, or any other period before making an attempt to solicit occupant feedback.

At 706, the supervisory device determines whether the notification delay timer has elapsed. If the supervisory device determines that the notification delay timer has not elapsed, method 700 reverts to step 704 and the notification delay timer continues to run until the configurable delay period has elapsed. If, however, the supervisory device determines that the notification timer has elapsed, method 700 proceeds to step 708.

At 708, the supervisory device transmits a notification message to the occupant device. In some embodiments, the supervisory device can apply criteria in addition to the notification delay timer to determine whether to transmit a notification message to the occupant device. For example, if the supervisory device has already received a sufficient amount of feedback from other occupants of the building space, the supervisory device can cease to transmit further notification messages. Determination of the sufficiency of the amount of feedback can depend upon multiple factors. These factors can include, but are not limited to, a total number of feedback messages received, a number of high credibility feedback messages received, a size of a building space, or the environmental condition of interest. In some embodiments, the supervisory device can apply location criteria to determine whether to transmit a notification message to the supervisory device. For example, if the occupant tracking devices detect that an occupant is in a low priority building space, the supervisory device may decline to transmit a notification message soliciting feedback from the occupant in the low priority space.

At 710, the supervisory device receives an occupant feedback message from the occupant device. In some embodiments, the occupant feedback message can include one or more occupant-assigned quality ratings regarding the environmental conditions of a building space. Quality ratings can be assigned using the user interface 600 of the APP, described above with reference to FIG. 6. In some embodiments, the occupant feedback message includes a picture of a building space taken by the occupant, or a comment regarding one or more environmental conditions entered by the occupant into a text box of the APP.

At 712, the supervisory device assigns a weighting factor to the occupant feedback data contained within the occupant feedback message. The credibility rating or weighting factor can be based on an occupant record stored in a database or immutable ledger (e.g., ledger system 512). For example, the credibility rating or weighting factor for an occupant who works in the building can be higher than the credibility rating or weighting factor for an occupant who is an infrequent visitor. In some embodiments, the weighting factor can be dependent on the occupant's feedback history. For example, an occupant who consistently provides anomalous feedback when compared with other occupants of the building (e.g., an occupant who appears to be attempting to maliciously skew the feedback) can have their credibility rating or weighting factor reduced so that the occupant's feedback has a smaller effect on the aggregated occupant feedback data.

At 714, the supervisory device modifies an environmental property of a building space based on aggregated and weighted occupant feedback data. Step 714 can encompass a variety of different actions performed by the supervisory device. For example, in some embodiments, step 714 can include the supervisory controller transmitting a control message to a field controller (e.g., field controller 508) to modify the operation of one or more HVAC devices. For example, if a number of occupants in a building space provide feedback indicating a negative air freshness condition in the space, the supervisory device can transmit a control message to a fan controller to cause a fan to be operated. In still further embodiments, step 714 can include the supervisory controller integrating the aggregated occupant feedback data as an input into a control algorithm. For example, occupant feedback data could be utilized to modify a setpoint (e.g., a temperature setpoint, a humidity setpoint) of a building space.

In further embodiments, step 714 can include the creation of a work request to improve an environmental property. In various embodiments, the work request could include cleaning of a particular building space, installation of additional lighting, or installation of security cameras. In still further embodiments, step 714 can include the supervisory device transmitting a message to all occupants of a building space. For example, if multiple occupants of a building space provide feedback indicating that the space is too warm to be comfortable, the supervisory device can transmit a message suggesting that the occupants of the space take a break and temporarily leave the space.

Figure 8:
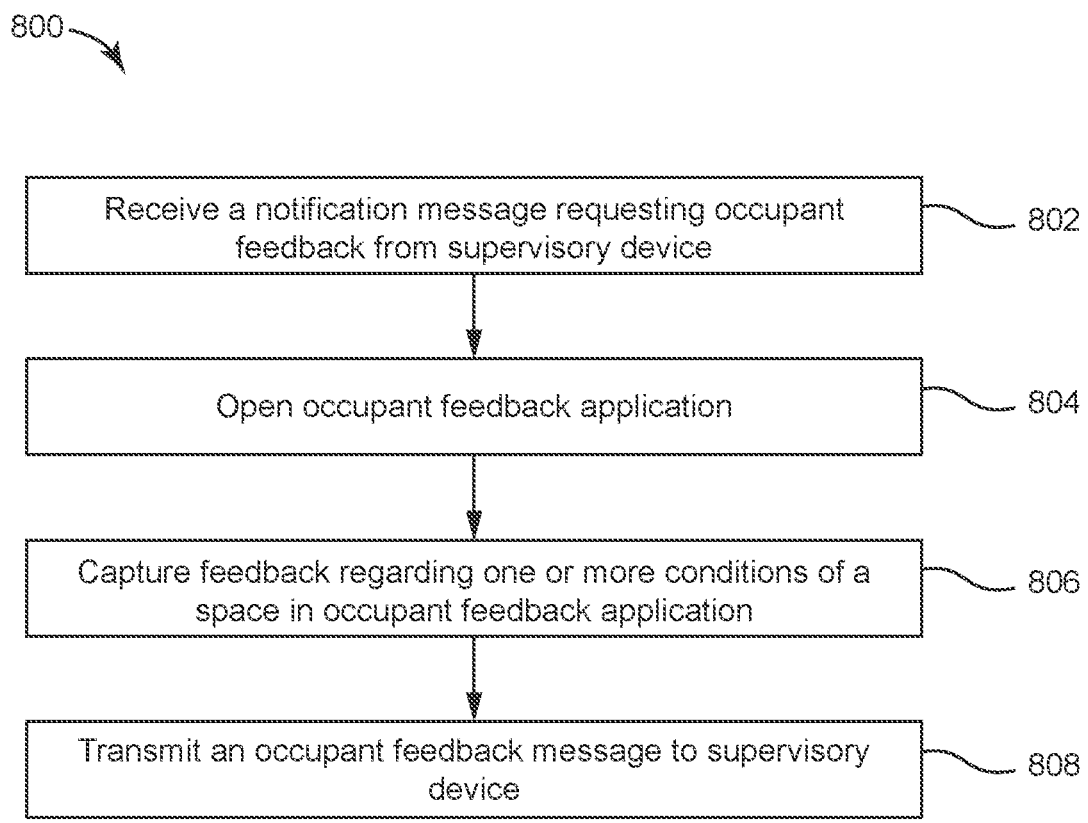
FIG. 8 is a flowchart of a process for providing occupant feedback from an occupant device, according to an embodiment.

Turning now to FIG. 8, a computer-implemented method 800 for providing occupant feedback is depicted according to an embodiment of the present disclosure. The method 800 may be performed by various systems and devices disclosed herein, such as the system 500 (e.g., client device 510).

At 802, a notification message is received by the mobile device from a supervisory device (e.g., the BAS controller 504). The notification message can include a request to provide feedback regarding the quality and/or condition of a building space. For example, the notification message can include text that is identical or similar to the following: "Is this room comfortable? Provide feedback now." The notification message can be displayed on the mobile device in any suitable format. For example, in various embodiments, the notification message can be received and displayed as a mobile device notification, a text message, an email message, or an in-APP message.

At 804, the mobile device opens the occupant feedback APP (e.g., APP 516). In some embodiments, the notification message received at step 802 can include a hyperlink to open the feedback APP. In some embodiments, the occupant can open the occupant feedback APP by navigating to the APP from a home screen or application menu.

At 806, the mobile device captures feedback regarding one or more conditions of a space using the occupant feedback APP. In some embodiments, step 806 can include an occupant assigning quality ratings to one or more environmental conditions of the building space using a user interface (e.g., user interface 600) of the APP. In some embodiments, step 806 can include the occupant taking a picture of a building space, or entering a comment into a text box.

At 808, method 800 concludes as an occupant feedback message is transmitted by the mobile device to the supervisory controller. In some embodiments, the occupant feedback message is transmitted by the mobile device as soon as the occupant assigns a quality rating to a building condition. For example, the mobile device may transmit the occupant feedback message as soon as the occupant clicks a button confirming the assignment of one or more quality ratings. In some embodiments, the occupant feedback message is transmitted as soon as the occupant closes the feedback APP, or at specified time intervals. Upon receipt of the occupant feedback message, the supervisory controller may perform various tasks to modify the environmental conditions of the building space. These tasks are described above with reference to step 714 of process 700.

The construction and arrangement of the systems and methods as depicted in the various embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to various embodiments. Other substitutions, modifications, changes, and omissions can be made in the design, operating conditions and arrangement of the embodiments without departing from the scope of the present disclosure.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computer implemented method of controlling the environmental conditions of a building in accordance with feedback from the occupants of the building, the method comprising:

detecting, by one or more processors, an occupant within a building space;

transmitting, by the one or more processors, a notification message to an occupant device associated with the occupant, the notification message comprising a request to provide occupant feedback;

starting, by the one or more processors, a notification delay timer to run for a configurable delay period responsive to detecting the occupant within the building space, the notification message transmitted, by the one or more processors, to the occupant device when the configurable delay period has elapsed;

receiving, by the one or more processors, an occupant feedback message from the occupant device, the occupant feedback message comprising a plurality of occupant feedback inputs regarding a plurality of building conditions;

assigning, by the one or more processors, a weighting factor to the occupant feedback message to form a weighted occupant feedback message; and performing, by the one or more processors, an action to modify at least one of the plurality of building conditions responsive to the weighted occupant feedback message.

2. The method of claim 1, comprising:
the notification message transmitted, by the one or more processors, to the occupant device based on a detected location of the occupant device.

3. The method of claim 1, comprising:
the notification message transmitted, by the one or more processors, to the occupant device based on an aggregate amount of occupant feedback.

4. The method of claim 1, comprising:
the notification message transmitted, by the one or more processors, to the occupant device based on the weighting factor associated with the occupant.

5. The method of claim 1, comprising:
the plurality of building conditions comprises at least one of a temperature condition, a humidity condition, an air freshness condition, a cleanliness condition, a security condition, and a lighting condition.

6. The method of claim 1, comprising:
the weighting factor based on a history of feedback received from the occupant.

7. The method of claim 1, comprising:
transmitting, by the one or more processors, a control signal to a field controller device to operate an HVAC system device.

8. The method of claim 1, comprising:
transmitting, by the one or more processors, a control signal to a field controller device to operate an HVAC system device, the HVAC system device including at least one of a chiller, a boiler, a rooftop air handling unit, a variable air volume unit, an economizer, a heating coil, a cooling coil, a fan, a pump, a valve, and a damper.

9. The method of claim 1, comprising:
generating a work request.

10. The method of claim 1, comprising:
the plurality of occupant feedback inputs comprises at least one of a quality rating associated with a building condition, a picture of a building space, and a text comment associated with a building condition.

11. A system of controlling the environmental conditions of a building in accordance with feedback from the occupants of the building, the system comprising:

a plurality of mobile devices, each of the plurality of mobile devices associated with an occupant in a building space;

a supervisory controller communicably coupled to the plurality of mobile devices, the supervisory controller configured to:

detect the occupant within the building space;

transmit a notification message to the mobile device associated with the occupant, the notification message comprising a request to provide occupant feedback;

start a notification delay timer to run for a configurable delay period responsive to detecting the occupant within the building space, the notification message transmitted to the mobile device associated with the occupant when the configurable delay period has elapsed;

receive an occupant feedback message from the mobile device, the occupant feedback message comprising a plurality of occupant feedback inputs regarding a plurality of building conditions;

assign a weighting factor to the occupant feedback message to form a weighted occupant feedback message; and perform an action to modify at least one of the plurality of building conditions responsive to the weighted occupant feedback message.

12. The system of claim 11, comprising:
an immutable ledger, the immutable ledger communicably coupled to the supervisory controller and configured to store at least one of an occupant record and a work request.

13. The system of claim 12, wherein the occupant record comprises the weighting factor associated with the occupant.

14. The system of claim 11, comprising:
a plurality of field controllers, the plurality of field controllers configured to control at least one of a chiller, a boiler, a rooftop air handling unit, a variable air volume unit, an economizer, a heating coil, a cooling coil, a fan, a pump, a valve, and a damper.

15. The system of claim 14, wherein performing an action to modify at least one of the plurality of building inputs comprises transmitting a control signal to at least one of the plurality of field controllers.

16. The system of claim 11, wherein the plurality of building conditions comprises at least one of a temperature condition, a humidity condition, an air freshness condition, a cleanliness condition, a security condition, and a lighting condition.

* * * * *